| United States Patent [19] | [11] | 4,220,679 |
|---|---|---|
| Backhouse | [45] | Sep. 2, 1980 |

[54] COATING PROCESS

[75] Inventor: Alan J. Backhouse, South Ascot, England

[73] Assignee: Imperial Chemical Industries Limited, London, England

[21] Appl. No.: 897,174

[22] Filed: Apr. 17, 1978

[30] Foreign Application Priority Data

Apr. 25, 1977 [GB] United Kingdom ............... 17123/77
Aug. 10, 1977 [GB] United Kingdom ............... 33500/77

[51] Int. Cl.² ......................... B05D 1/36; B05D 7/14; B05D 5/06
[52] U.S. Cl. .................................. 427/401; 427/407.2; 427/412.1; 427/407.1; 427/408; 427/409
[58] Field of Search ............... 427/385 R, 388 D, 401, 427/407 R, 409, 407 A, 407 C, 408

[56] References Cited

U.S. PATENT DOCUMENTS

| 4,025,474 | 5/1977 | Porter et al. .................... 260/22 CQ |
| 4,072,662 | 2/1978 | van der Linde et al. ... 427/385 R X |
| 4,115,472 | 9/1978 | Porter et al. .......................... 260/836 |
| 4,147,688 | 4/1979 | Makhlouf et al. ............. 260/33.6 EP |

FOREIGN PATENT DOCUMENTS

| 1242054 | 8/1971 | United Kingdom . |
| 1319781 | 6/1973 | United Kingdom . |
| 1451948 | 10/1976 | United Kingdom . |

Primary Examiner—James R. Hoffman
Attorney, Agent, or Firm—Cushman, Darby & Cushman

[57] ABSTRACT

A multilayer coating is produced by applying to a substrate as a base-coat composition a pigmented solution in a volatile organic liquid of a film-forming polymer, the solution also containing specified polymer microparticles, forming a polymer film from the base-coat composition, then applying to the film so obtained a transparent top-coat composition and finally forming a second polymer film upon the base-coat film.

11 Claims, No Drawings

COATING PROCESS

This invention relates to the application of protective and decorative coatings to surfaces, particularly the surfaces of automobile bodies.

It is well known to employ, especially in the automobile industry, coating compositions which contain metallic pigments; these are the so-called "glamour metallic" finishes whereby a differential light reflection effect, depending on the viewing angle, is achieved. To maximise this "flip" tone effect, careful formulation of the coating composition in regard both to the film-forming resin and to the liquid medium is required. Difficulties may be encountered in meeting this objective and at the same time achieving a high degree of gloss in the final finish such as is usually desired in the automobile field. For this reason, one of the procedures which has been proposed for producing metallic finishes is a two-coat procedure, in which there is first applied to the surface of the substrate a base-coat containing the metallic pigment and formulated so as to give the optimum "flip" effect, and there is then applied over the base-coat an unpigmented top-coat which will yield the desired degree of gloss without in any way modifying the characteristics of the base-coat.

An essential criterion of a successful two-coat metallic finish system is that there must be no tendency for the top-coat, when applied, to mix with, or even have any appreciable solvent action on, the previously applied base-coat. If this requirement is not fulfilled, the metallic pigmentation effect may be seriously impaired. In principle, this requirement could be met by using, in the base-coat and the top-coat respectively, film-forming materials which are mutually incompatible, but the necessary adhesion between the two coats would not then be obtained. A more practicable way of meeting the requirement is to arrange for the base-coat to be of the thermosetting type and to give that coat at least a short curing treatment before the top-coat is applied, but this introduces an undesirable complication into the production schedule by interrupting the spraying operation with a stoving operation. A more desirable state of affairs is that the base-coat should be capable of drying in a few minutes only, under normal spray-booth conditions, to an extent such that it is not disturbed by the application to it of the top-coat.

For two-coat automobile metallic finishes based on solutions of acrylic polymers in volatile organic solvents, one method which has been proposed in order to achieve the last-mentioned objective is to employ as the base-coat a pigmented solution of an acrylic polymer containing a cellulose ester, for example cellulose acetate butyrate, and as the top-coat an unpigmented solution of a specified cross-linkable acrylic copolymer together with a cross-linking agent for the copolymer; the base-coat is applied to the substrate and the top-coat is subsequently applied without any intermediate baking of the base-coat, a final stoving operation being given to cure the top-coat.

It has now been found that application of the clear top-coat to the pigmented base-coat of a two-coat finish can also be satisfactorily achieved, without necessarily resorting to an intermediate baking operation, if the polymer present in the base-coat incorporates a proportion of insoluble polymer microparticles.

According to the present invention there is provided a process for the production of a multilayer protective and/or decorative coating upon the surface of a substrate, which comprises the steps of:

(1) applying to the surface of base-coat composition comprising:
   (A) a film-forming polymer;
   (B) a volatile organic liquid diluent in which the polymer is dissolved;
   (C) polymer microparticles as hereinafter defined which are insoluble in and are stably dispersed in the solution of the film-forming polymer in the liquid diluent, in an amount of at least 10% of the aggregate weight of the film-forming polymer and the microparticles;
   (D) pigment particles also dispersed in the solution of the film-forming polymer in the liquid diluent;
(2) forming a polymer film upon the surface from the composition applied in step (1);
(3) applying to the base-coat film so obtained a transparent top-coat composition comprising:
   (E) a film-forming polymer;
   (F) a volatile carrier liquid for the polymer;
(4) forming a second polymer film upon the base-coat film from the composition applied in step (3).

The film-forming polymer constituent (A) of the base-coat composition used in step (1) of the process may be any of the polymers known to be useful in coating compositions. One suitable class of polymer consists of those which are derived from one or more ethylenically unsaturated monomers. Particularly useful members of this class are the acrylic addition polymers which are well established for the production of coatings in the automobile industry, that is to say polymers or copolymers of one or more alkyl esters of acrylic acid or methacrylic acid, optionally together with other ethylenically unsaturated monomers. These polymers may be of either the thermoplastic type or the thermosetting, cross-linking type. Suitable acrylic esters for either type of polymer include methyl methacrylate, ethyl methacrylate, propyl methacrylate, butyl methacrylate, ethyl acrylate, butyl acrylate and 2-ethylhexyl acrylate. Suitable other, copolymerisable monomers include vinyl acetate, vinyl propionate, acrylonitrile, styrene and vinyl toluene. Where the polymer is required to be of the cross-linking type, suitable functional monomers to be used in addition to the latter include acrylic acid, methacrylic acid, hydroxyethyl acrylate, hydroxyethyl methacrylate, 2-hydroxypropyl acrylate, 2-hydroxypropyl methacrylate, N-(alkoxymethyl) acrylamides and N-(alkoxymethyl)methacrylamides, where the alkoxy group may be, for example, a butoxy group, glycidyl acrylate and glycidyl methacrylate. The base-coat composition may in such a case contain also a cross-linking agent such as a diisocyanate, a diepoxide or, especially, a nitrogen resin, that is to say a condensate of formaldehyde with a nitrogeneous compound such as urea, thiourea, melamine or benzoguanamine, or a lower alkyl ether of such a condensate in which the alkyl group contains from 1 to 4 carbon atoms. Particularly suitable cross-linking agents are melamine-formaldehyde condensates in which a substantial proportion of the methylol groups have been etherified by reaction with butanol.

For the purposes of the foregoing general definition of the invention, the cross-linking agent, where present, is considered as being a part of the film-forming polymer (A).

The base-coat composition may incorporate a suitable catalyst for the cross-linking reaction between the film-forming polymer (A) and the cross-linking agent, for example an acid-reacting compound such as acid butyl maleate, acid butyl phosphate or p-toluene sulphonic acid. Alternatively the catalytic action may be supplied by the incorporation of free acid groups in the film-forming polymer, for example by the use of acrylic acid or methacrylic acid as comonomer in the preparation of an acrylic polymer.

The film-forming polymer may be prepared by solution polymerisation of the monomer(s), in the presence of suitable catalysts or initiators such as organic peroxides or azo compounds, e.g. benzoyl peroxide or azodiisobutyronitrile. Conveniently the polymerisation may be carried out in the same organic liquid that is to form the diluent constituent (B) of the base-coat composition, or in a liquid which is to form a part of that diluent. Alternatively the acrylic polymer may be prepared in a separate previous operation (e.g. by aqueous emulsion polymerisation) and then dissolved in a suitable organic liquid.

Other suitable members of the class of polymer derived from ethylenically unsaturated monomers are vinyl copolymers, that is to say copolymers of vinyl esters of inorganic or organic acids, for example vinyl chloride, vinyl acetate and vinyl propionate; the copolymers may optionally be partially hydrolysed so as to introduce vinyl alcohol units. An example of such a copolymer is that containing 91% vinyl chloride, 6% vinyl alcohol and 3% vinyl acetate by weight, sold commercially by Union Carbide Corporation under the name "Vinylite VAGH".

Instead of being a polymer derived from ethylenically unsaturated monomers, the polymer constituent (A) of the base-coat composition may be an alkyd resin or a polyester.

Such polymers may be prepared in known manner by condensation of polyhydric alcohols and polycarboxylic acids, with or without the inclusion of natural drying oil fatty acids. Suitable polyhydric alcohols include ethylene glycol, propylene glycol, butylene glycol, 1:6-hexylene glycol, neopentyl glycol, diethylene glycol, triethylene glycol, tetraethylene glycol, glycerol, trimethylolpropane, trimethyolethane, pentaerythritol, dipentaerythritol, tripentaerythritol, hexanetriol, oligomers of styrene and allyl alcohol (for example that sold by Monsanto Chemical Company under the designation RJ 100) and the condensation products of trimethylolpropane with ethylene oxide or propylene oxide (such as the products known commercially as "Niax" triols). Suitable polycarboxylic acids include succinic acid (or its anhydride), adipic acid, azelaic acid, sebacic acid, maleic acid (or its anhydride), fumaric acid, muconic acid, itaconic acid, phthalic acid (or its anhydride), isophthalic acid, terephthalic acid, trimellitic acid (or its anhydride) and pyromellitic acid (or its anhydride). Where it is desired to produce air-drying alkyd resins, suitable drying oil fatty acids which may be used include those derived from linseed oil, soya bean oil, tall oil, dehydrated castor oil, fish oils or tung oil. Normally it is preferred that the oil length of such an alkyd resin should not exceed 50%. All these polyester and alkyd resins contain a proportion of free hydroxyl and/or carboxyl groups which are available for reaction, if desired, with suitable cross-linking agents as discussed above.

As another alternative, the polymer constituent (A) of the base-coat composition may be a cellulose ester, in particular cellulose acetate butyrate, for example the grade of cellulose acetate butyrate marketed by Eastman Kodak and designated EAB 531-1, having an acetyl content of 3% and a butyryl content of 50% and a viscosity of 1–2 seconds as measured by ASTM Method D - 1343154T.

Yet another type of polymer which may be employed as the constituent (A) comprises the nitrogen resins, which have already been described in the role of cross-linking agents for acrylic polymers of the thermosetting type. These same resins can be employed as film-forming materials in their own right and, for this purpose, the preferred resins are again melamine-formaldehyde condensates in which a substantial proportion of the methylol groups are etherified by reaction with butanol. In order to assist curing of the resin, there will preferably also be incorporated in the base-coat composition a suitable catalyst, such as one of those already described. From what has been said above, it will be clear that there may also be employed as the film-forming constituent (A) a mixture of a thermosetting acrylic polymer and a nitrogen resin in such proportions that part of the latter functions as cross-linking agent and part as a supplementary film-former in its own right.

The volatile organic liquid constituent (B) of the base-coat composition may be any of the liquids, or mixtures of liquids, which are conventionally used as polymer solvents in coating compositions, for example aliphatic hydrocarbons such as hexane and heptane, aromatic hydrocarbons such as toluene and xylene, and petroleum fractions of various boiling point ranges which are predominantly aliphatic but have a significant aromatic content, esters such as butyl acetate, ethylene glycol diacetate and 2-ethoxyethyl acetate, ketones such as acetone and methyl isobutyl ketone, and alcohols such as butyl alcohol. The actual liquid or mixture of liquids selected as the diluent (B) will depend upon the nature of the film-forming polymer (A), according to principles which are well known in the coatings art, in order that the polymer shall be soluble in the diluent.

The polymer microparticles (C) present in the base-coat composition are polymer particles of colloidal dimensions, having a diameter of from 0.01 to 10 microns, preferably from 0.1 to 5 microns. The polymer of which the microparticles are composed must be insoluble in the solution of the polymer (A) in the liquid diluent (B); this insolubility may be achieved by suitable selection of the composition of the microparticle polymer, that is to say, the polymer may be one which is inherently insoluble in the polymer solution, but preferably it is achieved by introducing a sufficient degree of crosslinking into a polymer which, if not cross-linked, would actually be soluble in the solution of polymer (A) in diluent (B). Where insolubility of the microparticles is achieved through crosslinking, it is preferred that the degree of crosslinking should not be greater than that necessary to render the polyer insoluble. Insolubility of the microparticles in the solution of polymer (A) in diluent (B) may be checked by means of the following test. The microparticles (1 part by weight) are shaken for 30 minutes with the diluent (B) (100 parts by weight); the suspension is then centrifuged at 17,000 r.p.m. for 30 minutes. The supernatant liquid is decanted off and the residual polymer then dried for 30 minutes at 150° C., after which its weight is compared with that of the microparticles originally taken. This test may be difficult to apply in cases where the specific gravity of the diluent is close to or greater than that of the microparticles, but such diluents (e.g. chlorinated solvents) would not normally be used in the compositions under consideration. Where the result of this test indicates that the microparticles are acceptably insoluble in the diluent (B) alone, it can be assumed that the particles will be at least equally insoluble when the polymer (A) is also present; there would be practical difficulties in carrying out the test actually with the solution of polymer (A) in diluent (B).

The microparticle polymer may be of various types. It may, for example, be an acrylic addition polymer, derived from one or more of the same monomers as have been described above in connection with the film-forming polymer constituent (A). Where is is desired that such a polymer should be cross-linked, this may be achieved by either of two general methods: firstly, by including in the monomers from which the polymer is derived a minor proportion of a monomer which is poly-functional with respect to the polymerisation reaction, e.g. ethylene glycol dimethacrylate or divinylbenzene; or, secondly, by including in those monomers minor proportions of two other monomers carrying pairs of chemical groups which can be caused to react with one another either during or after the polymerisation reaction, such as epoxy and carboxyl (as for example in glycidyl methacrylate and methacrylic acid), anhydride and hydroxyl or isocyanate and hydroxyl. Alternatively, the microparticles may be composed of a condensation polymer, for example a polyester prepared from any of the polyhydric alcohols and polycarboxylic acids described above. Again, such polymers may be cross-linked if desired, by the incorporation of materials of functionality greater than two in the starting composition, although in this case, because of the characteristically broad distribution of molecular species formed in a condensation polymerisation, it may be difficult to ensure that all those species are in fact cross-linked.

The chemical composition and degree of cross-linking of the microparticle polymer may be such that it has a Tg (glass-rubber transition temperature) below room temperature, in which case the microparticles will be rubbery in nature; alternatively it may be such that the Tg is above room temperature, that is to say the particles will be hard and glassy.

As already stated, it is necessary that the polymer microparticles be stably dispersed in the solution of the base-coat film-forming polymer in the liquid diluent. By "stably dispersed" is meant that the particles are prevented from flocculating or aggregating by means of a steric barrier around the particles of polymer chains which are solvated by the said solution and hence are in a chain-extended configuraton. In this context the term "solvated" implies that the polymer chains in question, if they were independent molecules, would be actually soluble in the film-forming polymer solution; however, because the chains are in fact attached to the microparticles at one or more points along their length, the steric barrier remains permanently attached to the particles. It will be understood that the stabilising polymer chains to be used in any particular instance will be selected with reference to the nature of the liquid diluent and film-forming polymer concerned. In general terms this means that the chains will be of a degreee of polarity similar to that of the diluent and film-forming polymer, so that the combination of the latter will be inherently a solvent for the polymer of which the chains are composed. Since, in the two-coat automobile finishes to which the present invention is primarily directed, the liquid diluent will conventionally be of a relatively high degree of polarity (containing, for example, a substantial proportion of "strong" ester and ketone solvents) it follows that the stabilising chains on the microparticles will usually require to be of a composition such that they are inherently soluble in that type of liquid.

The mode of anchoring of the stabilising chains to the microparticles is conveniently discussed in connection with methods of making the particles, as follows.

The polymer microparticles may be produced in a variety of ways. Preferably they are produced by a process of dispersion polymerisation of monomers, in an orgnic liquid in which the resulting polymer is insoluble, in the presence of a steric stabiliser for the particles. Suitable proccesses of dispersion polymerisation are well-known and extensively described in the literature. Thus, so far as the dispersion polymerisation of ethylenically unsaturated monomers such as acrylic or methacrylic acid esters, vinyl esters and styrene or its derivatives is concerned, the procedure is basically one of polymerising the monomers in an inert liquid in which the monomers are soluble but the resulting polymer is not soluble, in the presence dissolved in the liquid of an amphipathic stabilising agent or of a polymeric precursor which, by copolymerisation or grafting with a portion of the monomers, can give rise in situ to such a stabilising agent. Reference may be made, for example, to British Pat. Nos. 941,305; 1,052,241; 1,122,397, and 1,231,614 for a general description of the principles involved, as well as to "Dispersion Polymerisation in Organic Media", ed. K. E. J. Barrett (John Wiley and Sons, 1975). Suitable ethylenically unsaturated monomers include methyl methacrylate, ethyl methacrylate, butyl methacrylate, ethyl acrylate, butyl acrylate, 2-hydroxyethyl acrylate, vinyl acetate, vinyl propionate, styrene and vinyl toluene. The production specifically of dispersions of crosslinked addition polymer particles can be achieved by including, in the monomers selected, pairs of monomers containing (in addition to the polymerisable unsaturated groups) groups capable of entering into chemical reaction with each other; for example, the epoxide and carboxyl groups contained in glycidyl methacrylate and methacrylic acid. By following the procedures particularly described in British Pat. Nos. 1,095,288 and 1,156,012, for example, particles are obtained in which there are present such complementary groups which, although not at that stage co-reacted, can be caused to co-react and so form cross-links by subsequently heating the dispersion to a suitably elevated temperature. Cross-linked addition polymers may also be prepared in dispersion by including in the monomers undergoing dispersion polymerisation a minor proportion of a monomer which is difunctional with respect to the polymerisation reaction, such as ethyleneglycol dimethacrylate or divinylbenzene.

Of the unsaturated monomers mentioned above, methyl methacrylate is an appropriate choice where it is desired that the polymer microparticles should have a high Tg value. Where the microparticles are required to be of low Tg, ethyl acrylate or vinyl acetate may be used, but it may be a more convenient alternative to copolymerise methyl methacrylate with minor proportions of "softening" monomers such as butyl acrylate or butyl methacrylate. It is preferred, however, that these softening monomers do not exceed 15% by weight of the total monomer composition; otherwise, there is a risk that the resulting polymer may be too soluble, even in low-polarity hydrocarbon diluents, for dispersion polymerisation to give rise to a stable dispersion of microparticles. Certain other softening monomers, such as 2-ethoxyethyl acrylate or 2-ethoxyethyl methacrylate, may be used in proportions greater than 15% if desired, but these are not as readily accessible as the corresponding lower alkyl esters.

Small proportions of comonomers incorporating carboxyl groups, e.g. acrylic acid or methacrylic acid, may be included (where the microparticles are to be cross-linked, such proportions would be in excess of those used in order to achieve cross-linking by reaction with a co-reactive monomer such as glycidyl methacrylate). Conversely, small (additional) proportions of an epoxide monomer, e.g. glycidyl methacrylate, may be included. Other functional monomers, such as hydroxyethyl acrylate or acrylamide, may also be included in minor proportions in the monomers from which the microparticles are to be derived.

The production of dispersions of condensation polymers is described, for example, in British Pat. Nos. 1,373,531; 1,403,794 and 1,419,199, and methods of obtaining cross-linked polymer particles are included in these descriptions. The general principles involved here are the same as those referred to above in connection with addition polymer dispersions, but there is a difference of detail arising from the commonly more highly polar nature of the monomers or starting materials from which condensation polymers are derived. This is, namely, that the monomers in question are usually insoluble in the inert liquid in which the polymerisation is to be carried out. Accordingly the first step in the dispersion polymerisation of the monomers is to bring them into a state of colloidal dispersion in the inert liquid, either as liquid or as solid particles. In the second step, polymerisation of the monomers takes place within those same particles. An amphipathic stabilising agent is required in each stage, firstly in order to stabilise the particles of monomer and secondly in order to stabilise the particles of polymer formed, but in suitable cases a single stabilising agent can be found which will perform both these functions. In place of using a pre-formed amphipathic stabilising agent in this process, there may be employed instead a suitable polymeric precursor which, by copolymerisation or grafting with a portion of the monomers being polymerised, can give rise to such a stabilising agent in situ. Reference may be made in this connection to British patent application No. 19487/76.

Suitable monomeric starting materials for preparing condensation polymer microparticles are those which are well-known for use in making such polymers by melt or solution polymerisation techniques. For example, suitable materials in the case of polyester microparticles are the polyhydric alcohols and polycarboxylic acids mentioned above in connection with the film-forming polymer (A). In the case of polyamide microparticles, suitable monomeric starting materials are amino acids, such as 6-aminocaproic acid or 11-aminoundecanoic acid, or the corresponding lactams, and/or polyamines, such as ethylene diamine, propylene diamine, hexamethylene diamine, diethylene triamine, triethylene tetramine or tris(aminomethyl) methane, in conjunction with the polycarboxylic acids mentioned above. It will, of course, be understood that, in the case of both polyester and polyamide microparticles, the mixture to be polymerised must incorporate some proportion of a starting monomer which has a functionality greater than two, where it is desired that the microparticles should be cross-linked.

In all the above-described dispersion polymerisation processes, the amphipathic stabilising agent is a substance the molecule of which contains a polymeric component which is solvatable by the liquid in which the dispersion is made and another component which is relatively non-solvatable by that liquid and is capable of associating with the polymer particles produced. Such a stabilising agent will be soluble as a whole in the dispersion liquid, but the resulting solution will usually contain both individual molecules and micellar aggregates of molecules, in equilibrium with each other. The type of stabilising agent preferred for use in the invention is a block or graft copolymer containing two types of polymeric component: one type consists, as stated above, of polymer chains which are solvatable by the dispersion liquid and the other type consists of polymer chains of different polarity from the first type which accordingly are not solvatable by that liquid and are capable of becoming anchored to the polymer microparticles. A particularly useful form of such a stabilising agent is a graft copolymer comprising a polymer backbone, which is the non-solvatable or "anchor" component, and a plurality of solvatable polymer chains pendant from the backbone. Specific examples of such graft copolymers include those in which the backbone is an acrylic polymer chain, derived predominantly from methyl methacrylate, and the pendant chains are residues of poly(12-hydroxystearic acid) which are readily solvatable by an aliphatic hydrocarbon medium. These copolymers may be made, for example, by first reacting poly(12-hydroxystearic acid) with glycidyl acrylate or glycidyl methacrylate, whereby the terminal —COOH group in the polymeric acid is converted to an ester derivative containing a polymerisable unsaturated grouping, and then copolymerising that derivative with methyl methacrylate, optionally together with minor proportions of other copolymerisable monomers. By empolying acrylic acid or methacrylic acid as such minor comonomers, it is possible to introduce carboxyl groups into the backbone chain of the graft copolymer with beneficial results inasmuch as the backbone is thereby rendered more polar than it is if composed of methyl methacrylate units alone. This increased polarity causes the backbone to be even less solvatable by a non-polar diluent such as an aliphatic hydrocarbon, and in consequence enhances the force whereby it becomes anchored to the microparticles.

Although it is preferred to prepare the polymer microparticles by means of dispersion polymerisation processes as just described, it may be necessary to subject the particles so obtained to a further treatment in order to render them suitable for use in the process of the invention. This need may arise in the following way. The most convenient inert liquids in which to carry out dispersion polymerisations are liquids of low polarity, for example aliphatic or aromatic hydrocarbons or mixtures thereof; this is because such liquids are non-solvents for the majority of polymers, whether of the addition or of the condensation type, and therefore, give scope for the widest choice of polymer or copolymer compositions according to the properties which it is desired the microparticles should possess. From the foregoing discussion it will, however, be appreciated that steric stabilising agents which are suitable for stabilising the microparticles in a simple low polarity liquid environment may no longer effectively stabilise them when they are transferred to the environment of the solution of the film-forming polymer (A) in the liquid diluent (B). One relevant factor is that (B) is likely to be a relatively highly polar liquid, where the formulation of automobile finishes is concerned, and another, perhaps more important, factor is that the polymer molecules (A) will now be competing with the chains of the stabilising agent for the solvating action of the diluent. The consequence is that transfer of the microparticles to the new environment will result in their de-stabilisation and flocculation.

It is, therefore, a preferred feature of the invention that microparticles which have been made by a dispersion polymerisation process are further associated with a polymer which is soluble in the volatile organic liquid constituent (B) of the base-coat composition and is also compatible with the film-forming polymer constituent (A). This further polymer, hereinafter referred to as the "auxiliary" polymer, is essentially non-cross-linked. It is believed that, when microparticles with which it is associated are introduced into the more highly polar environment of the solution of film-forming polymer (A) in the organic liquid (B), the chains of the auxiliary polymer now become solvated and take over at least in part from the original amphipathic stabiliser the function of maintaining the microparticles in a deflocculated, dispersed state. The scope of the present invention is not, however, in any way limited by the extent to which this belief is correct. The microparticles are most conveniently brought into association with the auxiliary polymer by following up the dispersion polymerisation process immediately with the polymerisation of further monomer, from which the auxiliary polymer is to be derived, in the original inert liquid medium and in the presence of the original stabilising agent.

In general, the auxiliary polymer will be required to have a composition such that it is compatible with the film-forming polymer (A), including any cross-linking agent for the polymer; indeed it may be identical with that polymer and, in certain circumstances as described below, even wholly replace it. The monomer or monomers from which the auxiliary polymer is to be derived will be chosen with this requirement in mind, as will be apparent to those skilled in the art.

On introducing the microparticles so treated into the solution of the polymer (A) in the liquid (B), part of the auxiliary polymer may be dissolved away by that more polar medium, but it is believed that a substantial portion of the auxiliary polymer chains remain attached to the microparticles (albeit now solvated by the medium), for example by virtue of their having become entangled with the chains of the microparticle polymer during their formation, or as a result of actual grafting onto those chains. If desired, the stability of the treated microparticles in the more polar medium may be enhanced by ensuring that covalent linkages are developed between the chains of the auxiliary polymer and those of the microparticles. This may be done, for example, by including an unsaturated carboxylic acid in the monomers from which the auxiliary polymer is derived. The carboxyl groups so introduced are able to react with epoxide groups, present in the microparticle polymer as the result of the use of a slight excess of the latter groups for the purpose of crosslinking that polymer by reaction with carboxyl groups in the manner described above.

The incorporation of the microparticles, made by dispersion polymerisation, into the basecoat composition may be accomplished in various ways. In the case where the microparticles have been treated with an auxiliary polymer, it may be sufficient simply to add strong solvents to the dispersion of those treated microparticles, relying upon sufficient of the auxiliary polymer being dissolved away from the treated microparticles in order itself to provide the whole of the film-forming polymer constituent (A), whilst still leaving enough of that polymer attached to the microparticles to ensure their stabilisation. Alternatively, a dispersion of the microparticles (whether treated with auxiliary polymer or not) may be blended with a solution of a pre-formed film-forming polymer (A) in a suitable diluent (B). Yet another possibility is to separate the microparticles from the dispersion in which they are made, for example by centrifuging, filtration or spray-drying, and then to blend the microparticles with a solution of a polymer (A) in a diluent (B) as before.

It will be understood from the foregoing description that, for the purposes of the definition of the invention hereinbefore given, the film-forming constituent (A) is considered to comprise that portion of the auxiliary polymer, if such polymer is employed, which is dissolved away from the microparticles when the latter are incorporated into the base-coat composition.

As an alternative to the use of dispersion polymerisation methods, the polymer microparticles may, for example, be produced by aqueous emulsion polymerisation of suitable unsaturated monomers, using procedures well known in the art. The microparticles are then obtained in the form of a charge-stabilised dispersion, from which the particles themselves can be separated, e.g. by spray drying. For incorporation into the base-coat composition, the microparticles are then re-dispersed in the solution in the diluent of the film-forming polymer, preferably by methods imparting high shear to the mixture such as pug milling or triple roll milling, in an analogous fashion to the dispersion of a pigment. By further analogy to pigment dispersion, the requisite steric stability of the microparticles may then be achieved simply as a result of an innate tendency of the film-forming polymer (which by definition is solvated by the diluent) to associate with the particles, for example through the interaction of polar groups present in the film-forming polymer and in the microparticle respectively. In producing the microparticles by aqueous emulsion polymerisation, some difunctional unsaturated compounds may be included in the polymerising monomers in order to give rise to a cross-linked polymer which will be insoluble in the solution of the film-forming polymer (A) in the diluent (B), whatever the nature of the latter. Here again, as in the case of microparticles made by dispersion polymerisation, it may be desirable to continue the emulsion polymerisation with a second feed of monomers which does not include any difunctional material and which gives rise to a polymer which is compatible with the solution of polymer (A) in diluent (B), in other words to associate with the microparticles an "auxiliary" polymer having the same function as that previously described.

The polymer microparticles (C) used in the process of the invention are present, as has already been stated, in an amount of at least 10% of the aggregate weight of the film-forming polymer (A) and the microparticles; preferably the amount is from 15% to 35% of that aggregate weight. For the purposes of this definition, the term "polymer microparticles" is to be understood as referring, in the case where auxiliary polymer is employed, to the microparticles proper together with that part of the auxiliary polymer associated therewith which cannot be dissolved away from the particles by the diluent (B), under the conditions of the insolubility test described above.

The pigment particles (D) included in the base-coat composition may range in size from 1 to 50 microns and may be of any of the pigments conventionally used in surface coating compositions, including inorganic pigments such as titanium dioxide, iron oxide, chromium oxide, lead chromate and carbon black, and organic pigments such as phthalocyanine blue and phthalocyanine green, carbazole violet, anthrapyrimidine yellow, flavanthrone yellow, isoindoline yellow, indanthrone blue, quinacridone violet and perylene reds. For the present purposes, the term "pigment" is here meant to embrace also conventional fillers and extenders, such as talc or kaolin.

The process of the invention is, however, of particular value in the case of base-coat compositions containing metallic flake pigmentation which are intended for the production of "glamour metallic" finishes chiefly upon the surfaces of automobile bodies as previously discussed. The presence of the polymer microparticles (C) in base-coats containing metallic pigmentation gives a valuable degree of improvement in metal control during the application of the base-coat and the subsequent application of the transparent top-coat. Suitable metallic pigments include in particular aluminium flake and copper bronze flake. In general, pigments of any kind may be incorporated in the base-coat composition in an amount of from 2% to 100% of the aggregate weight of the film-forming polymer (A) and the microparticles (C). Where metallic pigmentation is employed, this is preferably in an amount of from 5% to 20% by weight of the aforesaid aggregate weight.

Such pigments, whether metallic or otherwise, may be incorporated into the base-coat compositions with the aid of known dispersants. Thus, in the case where the main film-forming polymer is of the acrylic type, an acrylic polymer of similar composition may be employed as pigment dispersant. Any such polymeric dispersant is also considered to be part of the film-forming constituent (A).

If desired, the base-coat composition may additionally incorporate other known additives, for example viscosity modifiers such as bentone or cellulose acetate butyrate.

The film-forming polymer constituent (E) of the top-coat composition employed in step (3) of the process of the invention may be in general any of the polymers described above for use in the base-coat composition. Like the latter, it may be of either the thermosetting or the thermoplastic type. The acrylic polymers, particularly the thermosetting type, are especially suitable. The polymer (E) need not, however, be identical with the base-coat polymer (A). In one important respect, it may be clearly distinguished from the base-coat polymer: namely that, whereas the base-coat polymer is always employed in a state of solution in the organic liquid constituent of the base-coat composition, the top-coat polymer may be either in solution or in stable dispersion in the volatile carrier liquid (2) of the top-coat composition.

Thus, the carrier liquid (F) may be either a solvent or a non-solvent for the top-coat polymer. Where the liquid is to be a solvent, it may be any of the volatile organic liquids or mixtures thereof previously mentioned as suitable for use in the base-coat composition. Where the liquid is to be a non-solvent, it will tend to be of rather lower polarity than the former and may consist of one or more aliphatic hydrocarbons such as hexane, heptane or petroleum fractions of low aromatic content, optionally in admixture with liquids of high polarity as already referred to provided that the total mixture is a non-solvent for the top-coat polymer.

Where the top-coat composition is a polymer dispersion, this will in general be a sterically stabilised dispersion in which the polymer particles are stabilised by means of a block or graft copolymer, one polymeric constituent of which is non-solvatable by that liquid and is associated with the disperse polymer. The well-known principles according to which such dispersions may be prepared have been referred to above in connection with the making of the microparticles of the base-coat composition.

In the case where the top-coat polymer is of the thermosetting or cross-linking type, there may be incorporated in the top-coat composition a cross-linking agent, such as any of those which have been discussed above in connection with the base-coat composition. If the top-coat polymer is of the acrylic type, the proportion of cross-linking agent to polymer in the composition may vary widely, but in general a ratio of from 50:50 to 90:10 by weight of polymer to cross-linking agent is satisfactory. The precise proportion to be employed depends upon the properties required in the final film, but a preferred range affording a good balance of properties is from 60:40 to 85:15 by weight of polymer to cross-linking agent. Where it is of particular importance that the top-coat film should exhibit good resistance towards acid corrosion induced by severe atmospheric pollution, an especially preferred range of ratios of polymer to cross-linking agent is from 70:30 to 85:15 by weight.

As discussed in detail in connection with the base-coat composition, the top-coat composition may incorporate a suitable catalyst for the cross-linking reaction, or alternatively the top-coat polymer may be arranged to contain free acid groups.

The top-coat composition may in some cases contain both polymer in solution and polymer in dispersion. The soluble polymer may be a pre-formed polymer of different monomer composition from the dispersed polymer which, unlike the latter, is soluble in the carrier liquid (F) and is added as a solution therein to the dispersion. It may alternatively arise during the formation of the disperse polymer as the result of preferential polymerisation of certain of the monomers present. Again, it may be polymer which is originally formed in dispersion but which, unlike the main film-former, passes into solution when there are added to the continuous phase liquid of the dispersion other liquids of stronger solvency than the latter in the course of formulating a paint with the required application characteristics.

Usually, the top-coat composition will be substantially colourless so that the pigmentation effect due to the base-coat is not significantly modified, but it may be desirable in some cases to provide a transparent tinting of the top-coat composition.

In the first operational step of the process of the invention, the base-coat composition is applied to the surface of the substrate, which may be previously primed or otherwise treated as conventional in the art. The substrates which are of principal interest in the context of the invention are metals such as steel or aluminium which are commonly used for the fabrication of automobile bodies, but other materials such as glass, ceramics, wood and even plastics can be used provided they are capable of withstanding the temperatures at which final curing of the multilayer coating may be effected. After application of the base-coat composition, a polymer film is formed therefrom upon the surface of the substrate. If desired, this may be achieved by subjecting the substrate and the applied coating to heat in order to volatilise the organic liquid diluent, and it lies within the scope of the invention to employ a heating temperature sufficient to cross-link the base-coat film in those cases where the polymer in question is of the thermosetting type. However, a particular merit of the present invention is that it is sufficient to allow only a short period of drying at or about room temperature in order to ensure that the top-coat composition can be applied to the base-coat film without there being any tendency for the former to mix with or dissolve the latter in a way which can interfere with the correct orientation of the metallic pigmentation, whereby optimum "flip" effect is achieved. Typically, a drying time of from 1 to 5 minutes at a temperature of from 15° to 30° C. ensures that mixing of the two coats is prevented. At the same time, the base-coat film is adequately wetted by the top-coat composition, so that satisfactory intercoat adhesion is obtained.

After application of the top-coat composition to the base-coat film, the coated substrate is subjected to a curing operation in which the top-coat, and, optionally the base-coat also, is cross-linked with the aid of the cross-linking agent(s) present. This curing operation is carried out at an elevated temperature as is conventional in the thermosetting coating composition art, usually at a temperature in the range 100°-140° C., but, if desired, at a lower temperature provided the cross-linking system is sufficiently reactive.

In performing the process of the invention, the base-coat and top-coat compositions may be applied to the substrate by any of the conventional techniques such as brushing, spraying, dipping or flowing, but is preferred that spray application be used since the best results are thereby achieved in regard to both pigment control, especially of metallic pigment orientation, and gloss. Any of the known spray procedures may be adopted, such as compressed air spraying, electrostatic spraying, hot spraying and airless spraying, and either manual or automatic methods are suitable.

The thickness of the base-coat film applied is preferably from 0.5 to 1.5 mils and that of the top-coat from 1 to 3 mils (dry film thickness in each case).

The invention is illustrated but not limited by the following Examples, in which parts and percentages are by weight unless otherwise indicated.

EXAMPLE 1

(a) Preparation of Polymer Microparticles

To a vessel fitted with stirrer, thermometer and reflux condenser the following were added:

| | |
|---|---|
| Aliphatic hydrocarbon (boiling range 140°-156° C.: zero aromatic content) | 20.016 parts |
| Methyl methacrylate | 1.776 parts |
| Methacrylic acid | 0.036 part |
| Azo-diisobutyronitrile | 0.140 part |
| Graft copolymer stabiliser (33% solution) (as described below) | 0.662 part |

The vessel and contents were purged with inert gas and the temperature then raised to 100° and held there for 1 hour in order to produce a disperse polymer "seed". The following ingredients were pre-mixed and were fed into the vessel at a uniform rate over a period of 6 hours, maintaining stirring and heating at 100° C.:

| | |
|---|---|
| Methyl methacrylate | 32.459 parts |
| Glycidyl methacrylate | 0.331 part |
| Methacrylic acid | 0.331 part |
| Azodiisobutyronitrile | 0.203 part |
| Dimethylaminoethanol | 0.070 part |
| Graft copolymer stabiliser solution (as described below) | 6.810 parts |
| Aliphatic hydrocarbon (boiling range 140°-156° C.) | 33.166 parts |
| | 100.000 parts |

The contents of the vessel were held at 100° C. for a further 3 hours, to give full conversion of the monomers to a fine dispersion containing insoluble polymer gel microparticles (21-22% of the total dispersion) together with uncrosslinked polymer particles (23% of the total dispersion).

The graft copolymer stabiliser used in the above procedure was obtained as follows. 12-Hydroxystearic acid was self-condensed to an acid value of about 31-34 mg KOH/g (corresponding to a molecular weight of 1650-1800) and then reacted with an equivalent amount of glycidyl methacrylate. The resulting unsaturated ester was copolymerised at a weight ratio of 2:1 with a mixture of methyl methacrylate and acrylic acid in the proportions of 95:5.

(b) Modification of Microparticles with Auxiliary Polymer

To a vessel fitted as described in step (a), there were charged 63.853 parts of the dispersion obtained in step (a) above. The dispersion was heated to 115° C. and the vessel was purged with inert gas. The following ingredients were pre-mixed and were fed at a steady rate, over a period of 3 hours, to the stirred contents of the vessel, the temperature being maintained at 115° C.:

| | |
|---|---|
| Methyl methacrylate | 3.342 parts |
| Hydroxyethyl acrylate | 1.906 parts |
| Methacrylic acid | 0.496 part |
| Butyl acrylate | 3.691 parts |
| 2-Ethylhexyl acrylate | 3.812 parts |
| Styrene | 5.712 parts |
| Azodiisobutyronitrile | 0.906 part |
| Prim-octyl mercaptan | 0.847 part |
| Graft copolymer stabiliser solution (as described in step (a)) | 1.495 parts |

On completion of the addition, the contents of the vessel were held at 115° C. for a further 2 hours to achieve full conversion of the monomers, and 13.940 parts of butyl acetate were finally added, bringing the total charge to 100.000 parts. The dispersion so obtained has a total film-forming solids content of 45-46%; the content of insoluble gel polymer microparticles was 27.0-27.5%.

(c) Preparation of Base-Coat Composition

The following ingredients were blended:

| | |
|---|---|
| Dispersion from step (b) | 36.03 parts |
| Butylated melamine-formaldehyde resin (67% solution in butanol) | 11.03 parts |
| Dispersion of Carbazole Violet | |

-continued

| | |
|---|---|
| (6.1% in xylene) | 2.94 parts |
| Dispersion in Phthalocyanine | |
| Blue (9.7% in xylene) | 5.88 parts |
| Dispersion of Carbon Black | |
| (14.2% in xylene) | 0.74 part |
| Dispersion of Aluminium | 23.53 parts |
| Flake (35% paste in xylene) | |
| 2-Ethoxyethyl acetate | 14.71 parts |
| Butyl acetate | 5.14 parts |
| | 100.00 parts |

The resulting composition had the following analysis:

| | | |
|---|---|---|
| Total acrylic film-forming polymer | 75.0 pts | (non-volatile) |
| Insoluble gel acrylic polymer | 28.5 pts | " |
| Butylated M/F resin | 25.0 pts | " |

(d) Coating Process 100 parts of the basecoat composition prepared in step (c) was thinned by addition of 100 parts of butyl acetate, to give a viscosity of 22 secs in a B.S.B. 3 cup at 18% solids content. The thinned paint was applied by spray to a primed metal panel so as to give a film of thickness 0.0008" after loss of all solvents. After a 2-minute flash-off period at room temperature, the panels were over-coated with two coats of a thermosetting acrylic clear composition, a 2 minute flash-off period being allowed between coats. The dry film thickness of the clear coat was 0.0025". After a final flash-off period of 10 minutes at room temperature, the panels and coatings were stoved at 127° C. for 30 minutes.

The finishes thus obtained were of excellent appearance, having an even aluminium metal effect with no trace of movement of the metal flake (i.e. absence of "shear"). There was no sinkage of the clear top coat into the basecoat, so that the very high gloss level associated with the clear coat was in no way impaired by the basecoat, and yet there was excellent intercoat adhesion of the stoved panels. The coating also had good flexibility and humidity resistance.

The acrylic clear composition used as the top coat in the above procedure was made up as follows:

| | |
|---|---|
| Butylated melamine-formaldehyde resin, 60% solution in butanol | 22.0 parts |
| Dipentene | 9.5 parts |
| Butyl glycollate | 4.5 parts |
| Butanol | 2.5 parts |
| 2% solution of silicone oil | 0.4 part |
| Non-aqueous dispersion in aliphatic/aromatic hydrocarbon mixture of thermosetting acrylic resin, 42% solids | 50.0 parts |
| Solution of thermosetting acrylic resin, in xylene/butanol, 50% solids | 19.8 parts |

The composition had a viscosity of 60 seconds when measured at 25° C. in a B3 cup according to B.S. 1733:1955.

Comparative Example (a) Preparation of Base-Coat Composition without Polymer Microparticles The ingredients listed in Example 1(c) above were blended in the proportions stated, with the exception that the 36.03 parts of the dispersion from step (b) of Example 1 were replaced by 16.32 parts of a 65% solution in butyl acetate of a thermosetting acrylic resin, containing no polymer microparticles.

The resulting composition had the following analysis:

| | |
|---|---|
| Total acrylic film-forming polymer | 75.0 parts (non-volatile) |
| Butylated M/F resin | 25.0 parts (non-volatile) |

(b) Coating Process 100 parts of the base-coat composition prepared in step (a) above was thinned with 140 parts of butyl acetate to give a product having a solids content of 18%, the same as that of the thinned composition of Example 1(c). The product was applied as base-coat to a primed metal panel as described in Example 1(d), then over-coated with a thermosetting acrylic clear composition as therein described, allowed to flash-off and finally stoved.

The resultant finish was of poor, patchy appearance, exhibiting areas in which movement of the aluminium flake had occurred during flash-off.

EXAMPLE 2

The following ingredients were blended:

| | |
|---|---|
| Butylated melamine-formaldehyde resin (67% solution in butanol) | 28.5 parts |
| Cellulose acetate butyrate (1-2 seconds viscosity, containing 3% acetyl groups and 50% butyryl groups (Eastman-Kodak EAB 531-1); 20% solution in 2-ethoxyethyl acetate) | 42.15 parts |
| Dispersion of modified polymer microparticles (as described in Example 1, steps (a) and (b)) | 69.84 parts |
| Dispersion of Carbazole Violet (6.1% in xylene) | 7.59 parts |
| Dispersion of Phthalocyanine Blue (9.7% in xylene) | 1.89 parts |
| Dispersion of Carbon Black (14.2% in xylene) | 60.78 parts |
| Dispersion of aluminium flake (35% paste in xylene) | 60.78 parts |
| 2-Ethoxyethyl acetate | 37.98 parts |
| Xylene | 75.00 parts |

The above composition was employed as the base-coat in a coating process as described in Example 1, step (d), using the same acrylic clear top-coat composition as described therein. The results obtained were similar to those described in Example 1.

EXAMPLE 3

The following ingredients were blended:

| | |
|---|---|
| Butylated melamine-formaldehyde resin (67% solution in butanol) | 28.50 parts |
| Vinyl chloride/vinyl alcohol/vinyl acetate copolymer 91:6:3 ("Vinylite VAGH")*, 20% solution in 2-ethoxyethyl acetate | 93.20 parts |
| Dispersion of modified polymer microparticles (as described in Example 1, steps (a) and (b)) | 83.56 parts |
| Dispersion of Carbazole Violet (6.1% in xylene) | 10.12 parts |
| Dispersion of Phthalocyanine Blue (9.7% in xylene) | 20.18 parts |

-continued

| | |
|---|---|
| Dispersion of Carbon Black (14.2% in xylene) | 2.52 parts |
| Dispersion of aluminium flake (35% paste in xylene) | 81.04 parts |
| Butyl acetate | 150.00 parts |

*"Vinylite" is a Registered Trade Mark.

100 parts of the composition thus obtained were thinned by addition of 33 parts of butyl acetate. The thinned paint was applied by spray as base-coat in the manner described in Example 1, step (d), followed by application of an acrylic clear top-coat composition as described therein. The results obtained were similar to those of Example 1.

EXAMPLE 4

(a) 15.0 parts of nitrocellulose, dampened with 6.4 parts of isopropanol, were dissolved in a mixture of 53.6 parts of 2-ethoxyethyl acetate and 25.0 parts of n-butanol.

The nitrocellulose thus employed was specified as having a nitrogen content of 11.7–12.2% and, when dissolved as a 22–23% solution in 95% acetone, a viscosity of 400±25 centipoise at 20° C.

(b) The following ingredients were blended:

| | |
|---|---|
| Butylated melamine-formaldehyde resin (67% solution in butanol) | 28.5 parts |
| Nitrocellulose solution (as described in (a) above) | 69.9 parts |
| Dispersion of modified polymer microparticles (as described in Example 1, steps (a) and (b)) | 62.67 parts |
| Dispersion of Carbzaole Violet (6.1% in xylene) | 7.59 parts |
| Dispersion of Phthalocyanine Blue (9.7% in xylene) | 15.21 parts |
| Dispersion of Carbon Black (14.2% in xylene) | 1.89 parts |
| Dispersion of aluminium flake (35% paste in xylene) | 60.78 parts |
| Butyl acetate | 180.00 parts |

(c) Coating Process 100 parts of the base-coat composition prepared in step (b) was thinned by addition of 26 parts of 2-ethoxyethyl acetate, to give a viscosity of 26 secs in a B.S.B. 3 cup. The thinned paint was applied by spray to a primed metal panel so as to give a film of thickness 0.0005" after loss of all solvents. After a 2-minute flash-off period at room temperature, the panels were overcoated with two coats of a thermosetting acrylic clear composition as described in Example 1, a 2-minute flash-off period being allowed between coats. The dry film thickness of the clear coat was 0.0025". After a final flash-off period of 10 minutes at room temperature, the panels and coatings were stoved at 127° C. for 30 minutes.

The finishes thus obtained were of excellent appearance, the results being very similar to those obtained in the case of Example 1.

EXAMPLE 5

(a) Preparation of Base-Coat composition
The following ingredients were blended:

| | |
|---|---|
| Melamine/formaldehyde resin (67% solution in butanol) | 38.00 parts |

-continued

| | |
|---|---|
| Polymer microparticles dispersion (as described in Example 1, part (b)) | 83.56 parts |
| Alkyd resin solution (as described below) | 26.64 parts |
| Dispersion of Carbazole Violet (6.1% in xylene) | 10.12 parts |
| Dispersion of Phthalocyanine Blue (9.7% in xylene) | 20.28 parts |
| Dispersion of Carbon Black (14.2% in xylene) | 2.52 parts |
| Dispersion of Aluminium Flake (35% paste in xylene) | 81.04 parts |
| 2-Ethoxyethyl acetate | 50.64 parts |
| Butyl acetate | 35.00 parts |

The alkyd resin solution used in the above formulation was a 70% solids solution in xylene of a resin made by condensing coconut oil, trimethylolpropane, glycerol and phthalic anhydride in the molar proportions 1.0:4.05:0.5:5.14.

(b) Coating Process 100 parts of the base-coat composition prepared as in (a) was thinned by addition of 87 parts of butyl acetate, to give a viscosity of 23.25 secs. in a B.S.B. 3 cup at 25° C. The thinned paint was applied by spray to a primed metal panel so as to give a film of thickness 0.0008" after loss of all solvents. After a 2-minute flash-off period at room temperature, the panels were overcoated with two coats of a thermosetting acrylic clear composition, a 2-minute flash-off period being allowed between coats. The dry film thickness of the clear coat was 0.0025". After a final flash-off period of 10 minutes at room temperature, the panels and coatings were stoved at 127° C. for 30 minutes.

The finishes thus obtained were of excellent appearance, having an even aluminium metal effect with no trace of movement of the metal flake (i.e. absence of "shear"). There was no sinkage of the clear top-coat into the base-coat, so that the very high gloss level associated with the clear-coat was in no way impaired by the base-coat, and yet there was excellent intercoat adhesion of the stoved panels. The coating also had good flexibility and humidity resistance.

The acrylic clear composition used as the top-coat in the above procedure was made up as follows:

| | |
|---|---|
| Butylated melamine-formaldehyde resin, 60% solution in butanol | 22.0 parts |
| Dipentene | 9.5 parts |
| Butyl glycollate | 4.5 parts |
| Butanol | 2.5 parts |
| 2% solution of silicone oil | 0.4 part |
| Non-aqueous dispersion in aliphatic/aromatic hydrocarbon mixture of thermosetting acrylic resin, 42% solids | 50.0 parts |
| Solution of thermosetting acrylic resin, in xylene/butanol, 50% solids | 19.8 parts |

The composition had a viscosity of 60 seconds when measured at 25° C. in a B3 cup according to B.S. 1733:1955.

EXAMPLE 6

The procedure of Example 5 was repeated, except that the 26.64 parts of alkyd resin solution there described were replaced by 31.06 parts of a 60% solution in xylene of an alkyd resin obtained by condensing azelaic acid, phthalic anhydride, trimethylolpropane and neopentylglycol in the molar proportions of 0.346:0.654:0.369:0.777 respectively. Similar results to those described in Example 5 were obtained.

We claim:

1. A process for the production of a multilayer protective and/or decorative coating upon the surface of a substrate, which comprises the steps of:
    (1) applying to the surface a base-coat composition comprising:
        (A) a film-forming polymer;
        (B) a volatile organic liquid diluent in which the polymer is dissolved;
        (C) polymer microparticles of diameter 0.01 to 10 microns which are insoluble in the solution of the polymer (A) in the liquid diluent (B) and are stably dispersed therein in a non-flocculated state by means of a steric barrier around the particles of polymer chains which are solvated by the said solution, in an amount of at least 10% of the aggregate weight of the film-forming polymer and the microparticles;
        (D) pigment particles also dispersed in the solution of the film-forming polymer in the liquid diluent;
    (2) forming a polymer film upon the surface from the composition applied in step (1);
    (3) applying to the base-coat film so obtained a transparent top-coat composition comprising:
        (E) a film-forming polymer;
        (F) a volatile carrier liquid for the polymer;
    (4) forming a second polymer film upon the base-coat film from the composition applied in step (3).

2. A process as claimed in claim 1, wherein the film-forming polymer constituent (A) is a polymer or copolymer of one or more alkyl esters of acrylic acid or methacrylic acid.

3. A process as claimed in claim 1, wherein the film-forming polymer constituent (A) is an alkyd resin or a polyester.

4. A process as claimed in claim 1, wherein the polymer microparticles (C) consist of a polymer or copolymer of one or more alkyl esters of acrylic acid or methacrylic acid.

5. A process as claimed in claim 1, wherein the polymer microparticles have been produced by a process of dispersion polymerisation of monomers, in an organic liquid in which the resulting polymer is insoluble, in the presence of a steric stabiliser for the particles.

6. A process as claimed in claim 5, wherein the steric stabiliser is a graft copolymer of which one type of polymeric component is a polymer backbone which is not solvatable by the organic liquid and which is capable of associating with the microparticles and of which another type of polymeric component consists of a plurality of polymer chains, pendant from the backbone, which are solvatable by the organic liquid.

7. A process as claimed in claim 5, wherein the microparticles are further associated with a polymer, hereinafter referred to as auxiliary polymer, which is soluble in the volatile organic liquid constituent (B) of the base-coat composition and is also compatible with the film-forming polymer constituent (A).

8. A process as claimed in claim 7, wherein the microparticles are brought into association with the auxiliary polymer by following up the dispersion polymerisation process, whereby the microparticles are obtained, immediately with the polymerisation of further monomer, from which the auxiliary polymer is to be derived, in the original inert liquid medium and in the presence of the original stabilising agent.

9. A process as claimed in claim 1, wherein the polymer microparticles (C) are present in an amount of from 15% to 35% of the aggregate weight of the film-forming polymer (A) and the microparticles.

10. A process as claimed in claim 1, wherein the pigment particles (D) in the base-coat composition consist of a metallic flake pigment.

11. A process as claimed in claim 1, wherein the film-forming polymer (E) of the top-coat composition is a thermosetting acrylic polymer.

* * * * *